(12) United States Patent
Cesarano (10) Patent No.: US 9,536,149 B1
(45) Date of Patent: Jan. 3, 2017

(54) ELECTRONIC ASSESSMENTS, AND METHODS OF USE AND MANUFACTURE THEREOF

(71) Applicant: PROXY TECHNOLOGIES, INC., Reston, VA (US)

(72) Inventor: Patrick C. Cesarano, Washington, DC (US)

(73) Assignee: PROXY TECHNOLOGIES, INC., Reston, VA (US)

( * ) Notice: Subject to any disclaimer, the term of this patent is extended or adjusted under 35 U.S.C. 154(b) by 0 days.

(21) Appl. No.: 15/092,558

(22) Filed: Apr. 6, 2016

Related U.S. Application Data

(60) Provisional application No. 62/291,344, filed on Feb. 4, 2016.

(51) Int. Cl.
*G01R 29/08* (2006.01)
*G06K 9/00* (2006.01)
*G05D 1/00* (2006.01)
*G06K 9/62* (2006.01)

(52) U.S. Cl.
CPC ......... *G06K 9/00637* (2013.01); *G05D 1/0022* (2013.01); *G05D 1/0027* (2013.01); *G05D 1/0094* (2013.01); *G06K 9/6202* (2013.01)

(58) Field of Classification Search
CPC ...... G01S 19/13; G01S 5/0221; G01S 5/0226; G01S 5/16; G05D 1/0027; G05D 1/0038; H04N 5/2258
USPC .......... 701/2; 342/357.22, 357.37; 455/456.6
See application file for complete search history.

(56) References Cited

U.S. PATENT DOCUMENTS

| | | | | |
|---|---|---|---|---|
| 8,060,270 | B2 * | 11/2011 | Vian | G05D 1/104 348/144 |
| 9,129,355 | B1 * | 9/2015 | Harvey | G06T 7/0008 |
| 2006/0079997 | A1 * | 4/2006 | McLurkin | G06N 3/008 700/245 |
| 2010/0215212 | A1 * | 8/2010 | Flakes, Jr. | G01M 5/0025 382/100 |
| 2014/0336928 | A1 * | 11/2014 | Scott | G01N 21/88 701/468 |

* cited by examiner

*Primary Examiner* — Dalena Tran
(74) *Attorney, Agent, or Firm* — Kenealy Vaidya LLP (57) ABSTRACT

The disclosed subject matter relates to methods and apparatus facilitating assessments of structural and electronic features, parameters, characteristics or any combination thereof using one or more unmanned autonomous vehicles. In some embodiments, an unmanned vehicle may be configured to monitor one or both of the structural and electrical characteristics of an object, and can also include cooperative behavior between two or more unmanned vehicles to test electrical communication in a directional fashion.

20 Claims, 5 Drawing Sheets

ELECTRONIC ASSESSMENTS, AND METHODS OF USE AND MANUFACTURE THEREOF

CROSS REFERENCE TO RELATED APPLICATION

The present application claims the benefit of the earlier filing date of U.S. Provisional Application Ser. No. 62/291,344 filed on Feb. 4, 2016, the contents of which is hereby incorporated in its entirety by reference.

BACKGROUND

The disclosed subject matter relates to methods and apparatus facilitating assessments of structural and electronic features, parameters, characteristics or any combination thereof using one or more unmanned autonomous vehicles.

Generally, inspections of structures and various types of objects is necessary due to wear and tear caused by weather or other environmental elements. Electrical characteristics are often also required to be regularly assessed. Issues arising out of power failures, electronic transmission faults, and non-isotropic radiation can require periodic or continual assessment to assure a reliable communications link with any number of users attempting to utilize the structure.

Typically, structures in need of constant inspection include railway tracks, cellular phone towers, roads, bridges, dams, electrical power grids, power plants, water treatment plants, high-rise buildings, and oil refineries, among others. Human inspection can be significantly aided by an automated infrastructure that can provide constant or periodic monitoring, especially in cases that may be deemed dangerous or expensive to conduct an inspection or monitoring task by one or more individuals.

Cellular phone towers have become ubiquitous as the rise of cellular phone use continues to rise exponentially. As such, the structural and communication health of a cellular phone tower has become of increasing importance. Cellular phone towers can be subject to numerous problems that require maintenance. One such problem is basic structural maintenance due to environmental problems such as weather, pollution, debris and terrain. Additionally, the cellular phone tower can experience communication problems due to electrical issues such as failed equipment, interference, or even atmospheric phenomena such as solar flares, etc. Manually inspecting cell phone towers can be very laborious due to their heights, and maintenance crews are often required to travel large distances (since the towers are preferentially kept out of view). Further, maintenance crews risk potentially fatal accidents from falling, electrocution, etc.

SUMMARY

Some of the related art includes applications that use manned and unmanned vehicles to inspect various infrastructures. Manned vehicles often do not adequately address these problems. However, it can be beneficial to instead use unmanned vehicles for the inspection of various elements of the aforementioned infrastructure.

There are ample references in the related art facilitating solutions for monitoring various structures. In the aspect of physical assessments, traditional cameras are often used to provide pictures of the structure under visual inspection. However, such a visual inspection technique can become problematic when inspecting a large area, such as a railway track, or a high-rise structure, such as a cellular phone tower. Some solutions involving the mounting of cameras on unmanned vehicles are available. However, such solutions are usually limited to the context of providing immediate solutions to problems such as those involving weather hazards among others, but neglecting electronic assessment of the structure.

Electronic assessments, in the case of structures incorporating active elements such as communication equipment, also require supervision and maintenance. In most instances, maintenance of electric utilities in structures such as cellular phone towers or power plants have similar hazards as in the case of inspection of physical parameters. In some cases, vehicles such as airplanes, helicopters and ground-based vehicles can be used to inspect and make assessments of various electric parameters. However, these methods can be costly, time-consuming, and may involve a significant amount of human intervention.

In the case of structures facilitating communication equipment, such as cellular phone towers or structures facilitating communication for a large area, supervision is needed to address transmission and/or reception faults that may appear due to device breakdown, weather hazards, etc. Communication equipment is also often engineered to provide isotropic radiation such that transmission/reception signals are not treated preferentially based on the incoming/outgoing location of the signals. In some other instances, however, signals may be treated preferentially based on their location (i.e., directionally). For example, it may be more energetically efficient to transmit/receive signals in a "donut shaped" lobe around a transceiver if signals from directly above or below the transceiver are not expected. This could pertain to a transceiver at the top of a hill where it would be unlikely to receive a phone call transmission above the transceiver. In either case, it is usually beneficial to perform inspections to determine whether radiation emanating from these structures is isotropic or directional (depending on the desired radiation pattern for the particular structure). Thus, it could be beneficial to have one or more unmanned vehicles that could inspect cellular phone towers for structural and electrical integrity. Such unmanned vehicles could potentially perform a myriad of tasks to assure the operational viability of individual cellular phone towers.

Electronic assessment usually involves a communication handshake or other form of electronic communication with the equipment so as to assess the working status of the equipment. This process is not unlike communication handshakes prevalent in a local area network between a communication router and its network clients, wherein clients and the router are involved in bidirectional communication to make sure the network elements are connected. Mirroring such a technique of supervision or monitoring can be challenging when extended to structures mentioned above.

All of the foregoing drawbacks can make the methodology and results of an inspection inconsistent. Better solutions can be undertaken which could make the undertaking of maintenance easier, safer, and more reliable.

The present invention addresses the problems encapsulated in the preceding paragraphs. It may be beneficial to provide an unmanned vehicle, a system, method and manufacture thereof for assessing an object such that the necessity for human intervention is substantially reduced or eliminated. In some embodiments, an unmanned vehicle may be configured to monitor one or both of the structural and electrical characteristics of an object.

Some embodiments are therefore directed to an unmanned vehicle for assessing an object. The unmanned vehicle includes a control unit that is configured to move the unmanned vehicle to a plurality of positions relative to the object, a transceiver that is configured to transmit and receive signals at each of the plurality of positions and a data collection unit that is configured to capture at least one image at each of the plurality of positions. The unmanned vehicle further includes an assessment unit that is configured to assess at least one performance parameter associated with the object based on the communication between the transceiver and the object; and one or more structural parameters associated with the object based on the captured images.

Some of the disclosed embodiments are directed to a system for assessing an object structurally and electrically. The system provides for a plurality of unmanned vehicles wherein each of the plurality of unmanned vehicles further comprises a control unit that is configured to move the unmanned vehicle to at least one position relative to the object, a transceiver that is configured to transmit and receive signals from the object, an data collection unit that is configured to capture at least one image of the object and an assessment unit generating a local report based on the signals received by the transceiver unit. The system further provides for a central platform that is in communication with each of the plurality of unmanned vehicles. The central platform is configured to receive the at least one image of the object and the local report from each of the plurality of unmanned vehicles. It is further configured to determine at least one performance parameter associated with the object based on the received local reports; and determine one or more structural parameters associated with the object from the received images.

Yet other embodiments are directed to a method for assessing an object by an unmanned vehicle, the method comprising moving the unmanned vehicle to a plurality of positions relative to the object, transmitting signals from each of the plurality of positions and receiving signals at each of the plurality of positions, capturing at least one image at each of the plurality of positions and determining at least one performance parameter associated with the object based on the communication between the transceiver and the object, determining one or more structural parameters associated with the object based on the captured images.

BRIEF DESCRIPTION OF DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Unmanned Vehicles and their Operation

Figure 1:
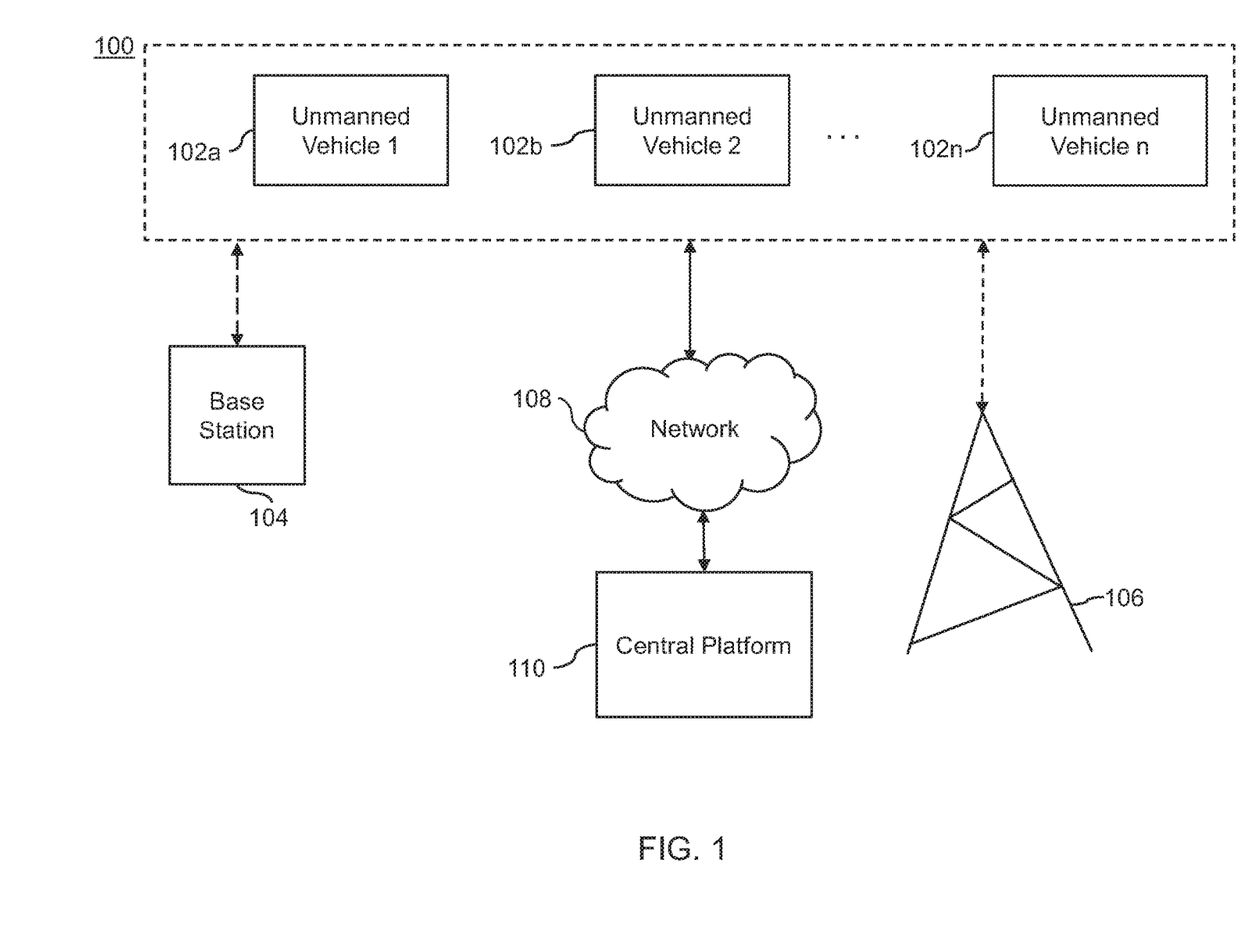
FIG. 1 is an exemplary embodiment of a system for assessing an object by using a plurality of unmanned vehicles in accordance with the disclosed subject matter.

FIG. 1 is a schematic of a system 100 wherein a plurality of unmanned vehicles 102a to 102n, working in conjunction with each other, are used to perform electronic and structural assessments of a cellular phone tower 106. One or more unmanned autonomous vehicles (a "swarm") 102a, 102b and so on to 102n can collectively interact with communications equipment on (say) a cellular phone tower 106 for the purpose of determining whether the communications equipment on cellular phone tower 106 is receiving and/or radiating as intended, which could be isotropically or in any configuration of preferentially directed radiation patterns. Each of the one or more unmanned vehicles could also relay image data to a base station 104. The unmanned vehicles 102a to 102n can be collectively referred to as an unmanned vehicle 102.

According to some embodiments, the base station 104 is also an unmanned vehicle, or could be a fixed control station, aquatic vehicle, satellite, a secondary swarm, or the like. The unmanned vehicle 102 can be either manually controlled by an operator at a base station or autonomously controlled by an unmanned vehicle using predetermined control algorithms. Control of the unmanned vehicle 102 may be a combination of operator control at a fixed base station, autonomous control, or various stages in between. The present invention includes any or all embodiments in related art in the context of control strategy of the unmanned vehicle 102.

According to other exemplary embodiments of the disclosed subject matter, the unmanned vehicle 102 can be operated aerially, on the ground, under water, and as a satellite from space.

According to some other embodiments of the present invention, the unmanned vehicle 102 operates using an energy source provided on the unmanned vehicle 102. The energy source can be, but not restricted to, fuel cells, photovoltaic cells, solar panels, lithium ion batteries, nickel cadmium batteries, internal combustion engines or a combination thereof. Further, the unmanned vehicle 102 may be propelled by exemplary propulsion systems that can include flight management protocols existing in related art. Flight management protocols are supported by various hardware components on the unmanned vehicle 102 such as rotors, propellers, microcontroller, and memory units. In some embodiments, the processor of the unmanned vehicle 102 can be a single core processor. In alternate embodiments, the unmanned vehicle 102 can be operated using a microcontroller. Exemplary embodiments are intended to include or otherwise cover any type of processor, including known, related art, and/or later developed technologies to enhance capabilities of processing data and/or instructions. The memory on the unmanned vehicle 102 can store data relating to signal addresses, images of an object, textual parameters relating to an object, graphical interface data, or location data of an object and unmanned vehicle 102. According to some embodiments, the location data may be obtained through a Geosynchronous Positioning System (GPS) or via a gyroscope that is part of the unmanned vehicle 102.

According to some embodiments of the disclosed subject matter, images captured by the unmanned vehicles 102 can be combined to form a high definition stereoscopic image of an object based on the position of each unmanned vehicle 102a to 102n. In the exemplary embodiment of FIG. 1, the object is shown to be a cellular phone tower 106. However, the object is not restricted to a cellular phone tower, but can include railway tracks, roads, bridges, dams, electrical power grids, power plants, water treatment plants, high-rise buildings, oil refineries and the like. All embodiments of the disclosed subject matter cover any object that have equipment that could facilitate electrical or communication solutions.

According to an exemplary embodiment of the disclosed subject matter, the unmanned vehicle 102 can communicate with the cellular phone tower 106 using any number of communications techniques. In some instances, one or more elements of the swarm could provide a transmission signal to the cellular phone tower 106, while other elements of the swarm could receive the reflected/re-transmitted communication. This assessment can provide an assessment of the directionality of the transmission/reception capabilities of the tower. Moreover, elements of the swarm can reverse roles, cross-testing the cellular phone tower 106 in an opposite direction. Furthermore, the swarm can transition flight paths, or even orbit, the cellular phone tower 106 to acquire a full 3-dimensional assessment (or map) of the tower's current radiation capability, which could be compared with a desired or expected pattern to determine the electronic health of the tower. This approach could be further assisted by using beam formation techniques disclosed in the existing literature and related art, such that an electronic assessment of the cellular tower 106 is performed with even higher precision depending on the angles of incidence and reception of a communication signal. As will be clear to one of skill in the art, this technique can also lend itself to "arpeggio" testing, which could comprise any permutation of the transmission and reception of signals to or from any of the swarm elements. For example, in a swarm with 8 elements positioned left-to-right and (respectively) and labeled 1-8, 8!=40,320, 40,318 different combinations of transmitting and receiving are possible (the last to corresponding to "all transmitting" or "all receiving" which are not useful without a new entity performing a transmitting or receiving function). Any or all of these combinations could be cycled through to build a statistical table of transmission and reception signal quality to/from the cellular tower 106.

Figure 2:
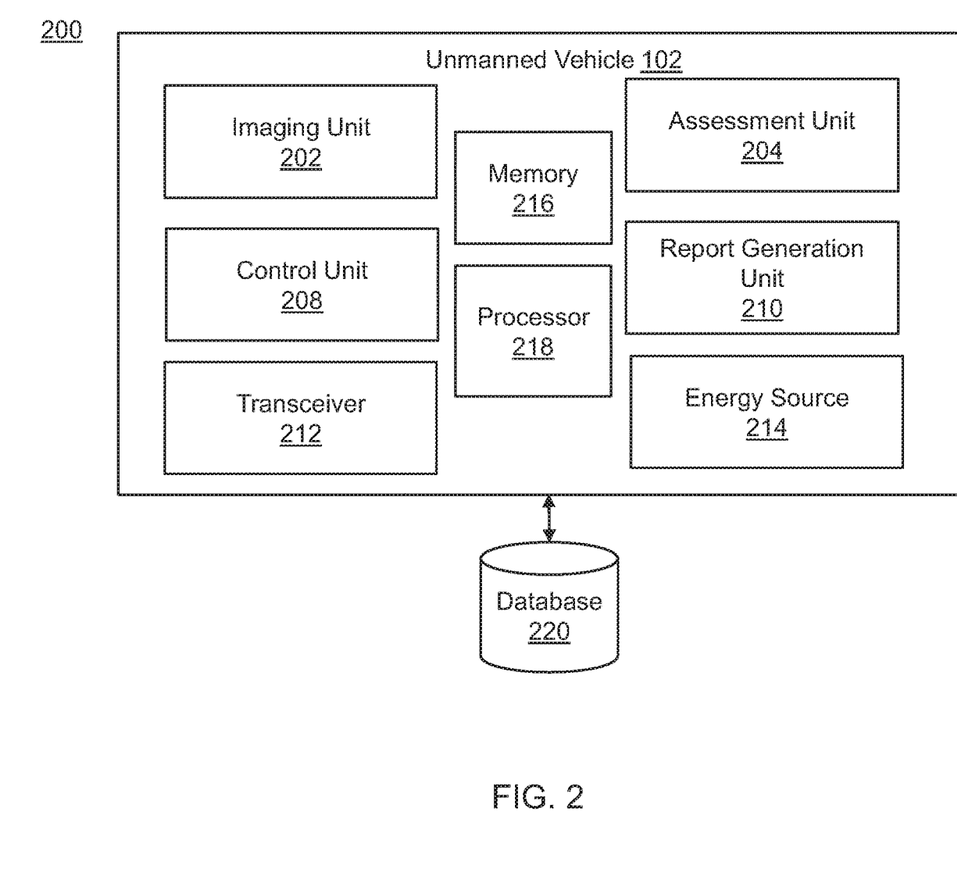
FIG. 2 illustrates the components of the unmanned vehicle in accordance with the disclosed subject matter.

FIG. 2 is a schematic of certain components in the unmanned vehicle 102 in accordance with an exemplary embodiment of the present invention. The unmanned vehicle 102 includes imaging data collection unit 202 (which could be an imaging unit, SONAR, RADAR, light field, or any other device configured to collect data), assessment unit 204, control unit 208, a transceiver 212, a report generation unit 210, an energy source 214, a memory unit 216 and a processor 218. In some embodiments, the unmanned vehicle 102 is not restricted to the aforementioned units and it is intended that any number of components in the unmanned vehicle 102 may be provided for the structural and electronic assessment of an object. The data collection unit 202 can capture images in addition to other forms of data. The data collection unit 202 may include any type of imaging devices available in the related art and technical literature, and can allow both highly detailed images and/or video to be captured. The unmanned vehicle 102 is further coupled to a database 220 such that captured images are transferred from the memory unit 216 to the database 220. In some embodiments, the captured images are sent to a central platform 110 in order to form composite images that are three dimensional (3D) and stereoscopic enabling comparison of the composite image with a reference image of the cellular phone tower 106 stored on the database 220. In other exemplary embodiments, the assessment unit 204 forms the stereoscopic image composed of captured images from some or all of the unmanned vehicles 102. Thus, the stereoscopic image includes different perspectives of the cellular phone tower 106 thereby providing a perception depth and subsequently higher detail in performing any structural assessment of the cellular phone tower 106.

In some further embodiments, each of the swarm elements 102a through 102n can be used to record the angles, frequencies, and amplitudes of incoming photons to form a collective swarm "light field". In this scenario, rather than directly imaging an objective, the general presence of light of different frequencies, amplitudes, and directions is recorded. This practice can culminate in recorded 3-dimensional light fields (one or more per unmanned vehicle). This information can then be collated and reconstructed later to perform selective zooming and focusing functions on any elements captured in the light field, and even to perform such functions as rotating a viewer perspective around an element of interest (even if the unmanned vehicles themselves never imaged the element from that angle). This capability is made possible because "all" of the light in the vicinity of the swarm is captured (without lensing or filtering that could obscure or exclude some light), allowing all light waves to be recorded and preferentially post-processed to identify features of interest without re-deploying the swarm for a "second look" at a feature of interest. That is, the same aggregated light field data could focus and zoom in on a feature very near to the swarm (with a second feature far from the swarm possibly blurred or obscured), while the same data set could be used to focus and zoom in on the second feature with the first feature possibly blurred or obscured. The result is two seemingly different images from different angles, magnifications, etc. derived from the same data set.

The position of each unmanned vehicle 102a to 102n determines the configuration of the swarm. The control unit 208 is used to position each unmanned vehicle 102. Different configurations can be used to capture the most detailed images such that the integrity of the cell tower 106 is monitored. For example, the unmanned vehicles 102a to 102n could be configured in a V-formation that would cause each unmanned vehicle 102 to be well separated. This would allow the unmanned vehicles 102 to individually receive and mutually combine images from the cellular phone tower 106. The unmanned vehicles 102 can act as spaced apertures that provide an assessment of a depth in addition to a two dimensional (2-D) optical assessment that a single aperture might provide. Previously, stereoscopic analysis is conducted by singular entities with cameras separated by a fixed distance.

While the approach works in determining depth perception, the effect of stereoscopic analysis is vastly improved as the angle between the receptors approaches 90°. This effect is also amplified as the distance between the receptors or data collection unit 202 increases, because the receptors are more likely to be physically closer to right angles relative to the feature they are observing. Thus, an unmanned vehicle swarm is capable of performing depth perception that is significantly enhanced as compared to an independent entity. The unmanned vehicles 102a to 102n can be positioned such that each of the unmanned vehicles 102 are relatively orthogonal to the cellular phone tower 106.

By adopting a swarm configuration such as the V-formation for the unmanned vehicles 102a to 102n, control can be distributed among the unmanned vehicles 102a to 102n. The overall response of the system 100 can thus be robust and adaptive with respect to changes in the environment.

According to a further embodiment of the disclosed subject matter, the transceiver 212 sends and receives signals from the cellular phone tower 106. The transceiver 212 can use communication methods that can include radio communications based on any frequency spectrum. The unmanned vehicle(s) 102 can communicate with the cellular phone tower 106 exclusively or collectively from any given direction. According to some embodiments of the disclosed subject matter, the transceiver 212 can communicate with the cellular phone tower 106 from one position and receive a response signal from the cellular phone tower 106 at an alternative position. As previously mentioned, the use of beam forming can assist this process by submitting and receiving directional signals at odd angles to the swarm formation (such as 42° below altitude and 37° east of the formation) in order to test multiple transmission/reception angles of the cell phone tower 106. This approach can remove or reduce the need to physically re-configure the position of elements in the swarm. Of course, such a strategy can further employ "arpeggio" testing formations to complete a cellular tower 106 inspection in as few passes as possible, preferably only one.

According to some embodiments of the disclosed subject matter, a Radio Detection and Ranging (RADAR) system may also be provided in the transceiver unit 212. This can further facilitate cellular phone tower detection and assessment by using radio waves such that range, angle, and/or velocity of a swarm element relative to the cellular phone tower 106 may be ascertained. Using RADAR, further structural and electronic parameters of the cellular phone tower 106 can also be assessed. In some embodiments, an unmanned ground vehicle may be equipped with a RADAR transceiver. The swarm of unmanned vehicles 102a to 102n can then be a combination of ground and aerial unmanned vehicles. In another embodiment, the swarm of unmanned vehicles 102a to 102n are configured to have phased array transceivers so as to direct transmitted signals towards a specific part of the cellular phone tower 106. For example, communication equipment on a cellular phone tower may be facing the east and thus the unmanned vehicles 102a to 102n have to orient their communication signals in accordance to the position of communication equipment. The unmanned vehicles 102 are directed to adopt a swarming configuration with the control unit 208 positioning each unmanned vehicle 102 appropriately while the transceiver 212 is directed to transmit signals in the direction of the communication equipment on the cellular phone tower 106. Accordingly, the unmanned vehicles 102 may be repositioned to facilitate receiving a response from the cellular phone tower 106 from any direction, thereby enabling directional analysis of radiations emanating from the cellular phone tower 106 and assessment of the level of intensity of the signals emanated.

In some embodiments, the report generation unit 210 can be configured to generate an inspection report. The inspection report is based on any anomalies arising by comparing any of the aforementioned data collection/testing method information with reference information from the cellular phone tower 106. The inspection report can further include performance parameters determined from signals received by the transceiver 212 in response to signals transmitted toward the cellular phone tower 106. In some embodiments, the assessment unit 204 of the unmanned vehicle 102 can generate a local inspection report. In alternate embodiments, the inspection report may also include, but is not restricted to, a type of structural parameter, a type of detection technique used to determine the structural parameter, and the like as well as performance parameters relating to communication involving the cellular phone tower 106. The performance parameters are determined from the intensity of response signal, time in which the response was received from the instant a signal was transmitted toward the cellular phone tower 106.

In some embodiments, the transceiver 212 can transmit the inspection report to the central platform 110 through the communication network 108. Embodiments of the disclosed subject matter are intended to include or otherwise cover any type of techniques, including known, related art, and/or later developed technologies to transmit the inspection report to the central platform 110. The inspection report is sent to the central platform 110 such that performance of the communications equipment and damage attributed to the communication equipment can be quantified. In other embodiments, performance and any damage attributed to the communications equipment on the cellular phone tower 106 is determined at the assessment unit 204 based on the local report generated at the assessment unit 204.

In alternate embodiments, the transceiver 212 can transmit the inspection report to the assessment units 204 of other companion unmanned vehicles 102.

Figure 3:
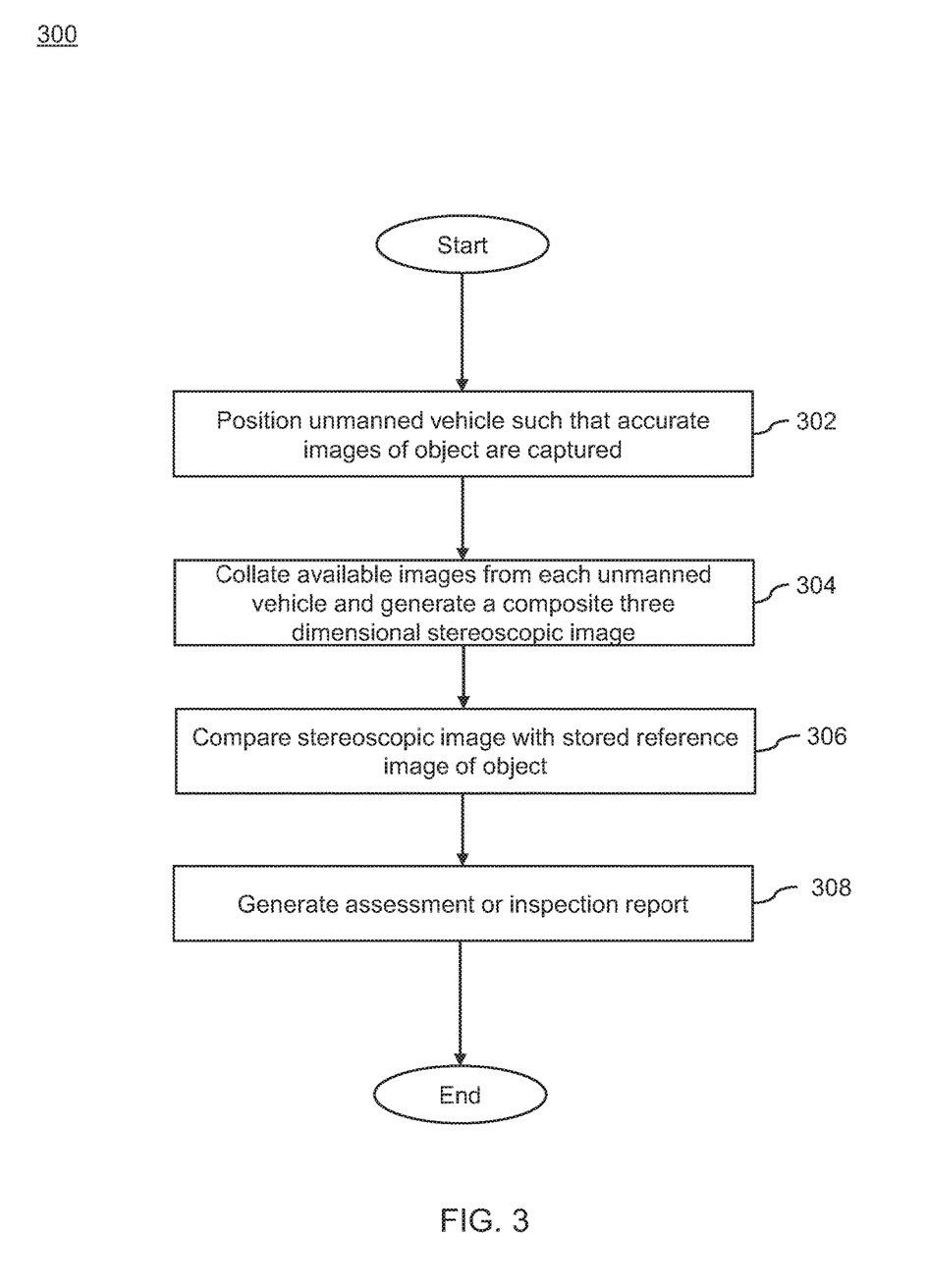
FIG. 3 is a method for assessing the structure of an object in accordance with the disclosed subject matter.

II. Assessment of Object using Unmanned Vehicles and Other Exemplary Embodiments FIG. 3 illustrates a procedure 300 for assessing the structural parameters of a cellular phone tower 106 using an unmanned vehicle 102 or a swarm of unmanned vehicles 102a to 102n in accordance with the disclosed subject matter. Exemplary embodiments are intended to cover the method 300 and any methods to assess the structural parameters of the cellular phone tower 106.

In accordance with FIG. 3, at step 302 the unmanned vehicle 102 is positioned by the control unit 208, such that the data collection unit 202 captures (for example) images of the cellular phone tower 106. The data collection unit 202 can be any device that uses conventional data detection techniques (such as photography) to capture images, sound, light, or any other form of information. At step 304, captured data is collated with other unmanned vehicles 102, and a composite data set is formed using the captured data. In some embodiments, the captured data could be individual images, and the data set could be a compiled stereoscopic image. In other embodiments, the captured data could be individual light-field data sets, SONAR data, millimeter-wave imaging data, terrain feature data (such as elevation), etc.

At step 306, the data is compared with reference data stored in the database 220. The reference data is typically an image of the cellular phone tower 106 and can include the areas surrounding the cellular phone tower 106, but could also include data from any of the previously mentioned means such as microwave or sonar reflections, digital communication throughput, and the like. Subsequently, at step 308, an assessment or inspection report based on the comparative data is generated and transmitted to the base station 104. The inspection report includes on any anomalies arising by comparing the generated data and reference data from the cellular phone tower 106.

Figure 4:
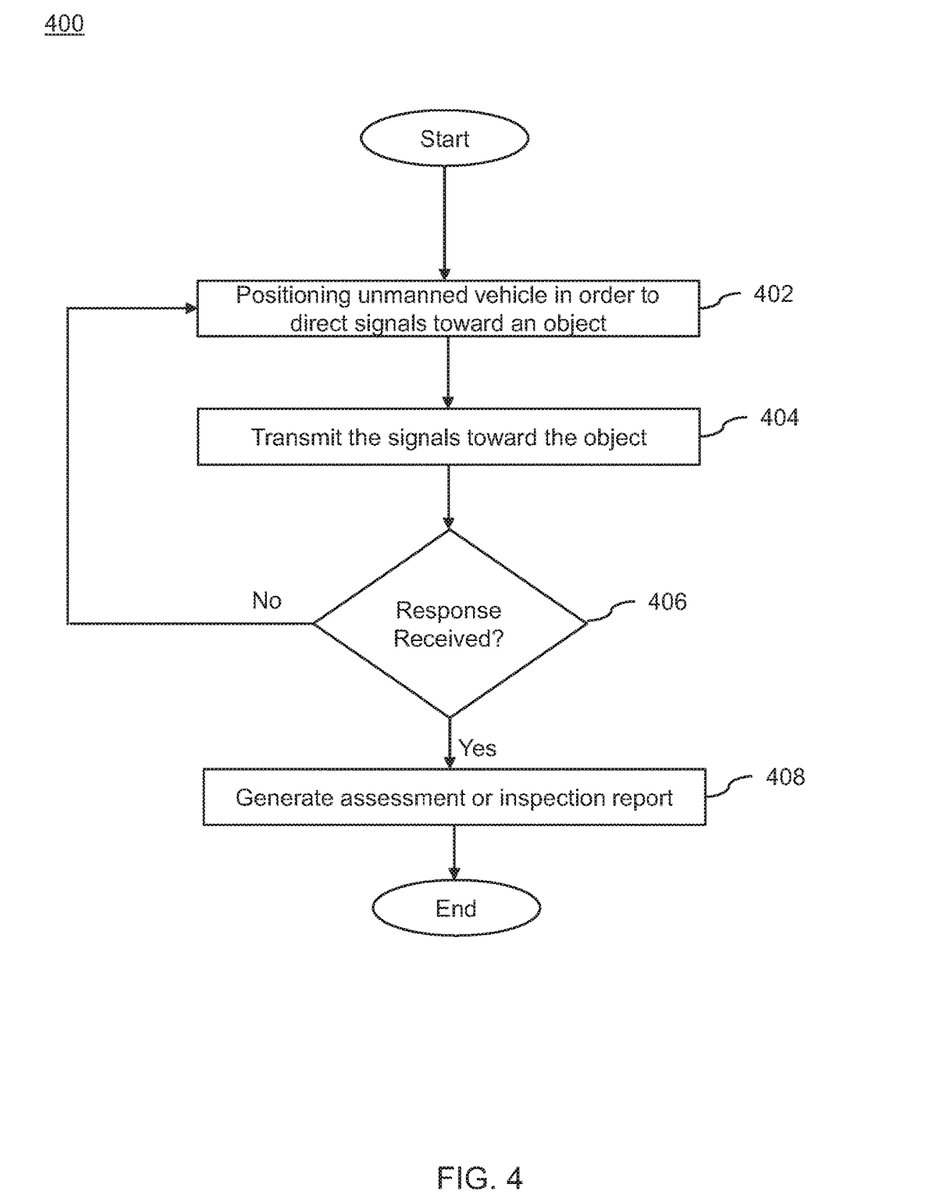
FIG. 4 is a method for assessing the electrical (communication) characteristics of an object in accordance with the disclosed subject matter.

FIG. 4 illustrates a procedure 400 for assessing the performance parameters relating to communication and electronics of the cellular phone tower 106. In accordance with FIG. 4, the unmanned vehicle 102 is positioned such that signals can be transmitted toward the cellular phone tower 106 at step 402. The positioning of the unmanned vehicle 102 is done by the control unit 208, the step including storing of data related to the position of the unmanned vehicle 102.

At step 404, the transceiver 212 transmits signals toward the cellular phone tower 106. The transceiver 212 can use communication methods that can include radio communications based on any frequency spectrum. The unmanned vehicle(s) 102 can communicate with the cellular phone tower 106 exclusively or collectively from one or more directions. According to some embodiments of the disclosed subject matter, the transceiver 212 can communicate with the cellular phone tower 106 from one position and receive a response signal from the cellular phone tower 106 at an alternative position. Additionally, and as described above, the unmanned vehicle(s) 102 can reverse roles to cross-check communications along different directions with the cellular phone tower 106, and can further do so in multiple configurations of transmitter(s)/receiver(s).

At step 406, a response from the cellular phone tower 106 is expected and if received, performance parameters from the received signal are determined at step 408. If the transceiver 212 does not receive any response, the assessment unit returns to step 402.

This process may be repeated multiple times by each unmanned vehicle 102 during the assessment of the cellular phone tower 106. During each iteration, either one or both of a generated assessment or inspection report is performed at step 408. If there is no response, the physical position of the unmanned vehicle 102 or the directionality of the steered transmission beam is modified and the process repeated. The transceiver can send and receive signals from the cellular phone tower 106 at any position so as to assess the radiation patterns of the cellular phone tower 106. If a signal is not received within a pre-determined time period from the instant the transceiver 212 has sent a signal, or too many attempts at establishing communication with one or more components (and/or from one or more directions) from the cellular phone tower 106 have resulted in failure, the communication equipment is deemed to be faulty.

The assessment report generated by a given unmanned vehicle 102 can be based on any performance parameter determined from the response received by the transceiver 212. The performance parameters are often determined from at least one of the intensity of response signal, the time in which the response signal was received from the instant the signal was transmitted toward the cellular phone tower 106, the transmitted and received frequency, data rate, and other various communication parameters. The inspection report can be sent to the central platform 110, base station 104, or can be sent to other elements in the swarm for compilation or relay to any other destination. Typically, the inspection report will relate that the observed performance of the communications equipment, damage attributed to the communication equipment, or any other relevant data metric such as structural integrity (say, based on millimeter-wave imaging), etc.

According to some other embodiments of the disclosed subject matter, and as briefly discussed above, another unmanned vehicle swarm operation for the compiling of data of the cellular phone tower 106 could be to perform light field imaging, where light emanating from the cellular phone tower 106 as waveforms or photons is collected by the unmanned vehicles 102. In this situation, the unmanned vehicles 102 do not need to focus on any particular object, but merely record the direction, frequency, and/or amplitude of light emanating from the cellular tower 106. By correlating this information between the unmanned vehicles, any region of interest may be selectively focused upon at a later time using image processing, as light traveling in all directions has already been captured, and thereby any perspective point of view anywhere within the light field may be taken by preferentially analyzing some photons in favor of other photons. One way to accomplish this could be to stack unmanned vehicles 102 along X, Y, and Z-axes, and compiling data from the light received by each to form a light field data set.

According to some other embodiments of the disclosed subject matter, the unmanned vehicles 102 could selectively project separate (say) laser frequencies from one or more unmanned vehicles towards a tower, and receive the interference pattern by a second (or more) unmanned vehicle. This information could be used to create a three dimensional (3-D) holographic image of the cellular phone tower 106. As discussed above, the number of transmitting/receiving unmanned vehicle 102 permutations could be up to $n!-2$ for n unmanned vehicles 102 (subtracting the "all transmitting" and "all receiving" formations). Any of these strategies could be employed to derive extremely high-definition images of a cellular phone tower 106. Each of the fore stated techniques (especially millimeter-wave imaging) could also be processed by the assessment unit 204 or the central platform 110 to determine changes in the atmosphere, so that factors such as ozone depletion, pollution etc. that might be affecting the cellular phone tower 106 structure or communications throughput may be performed.

Figure 5:
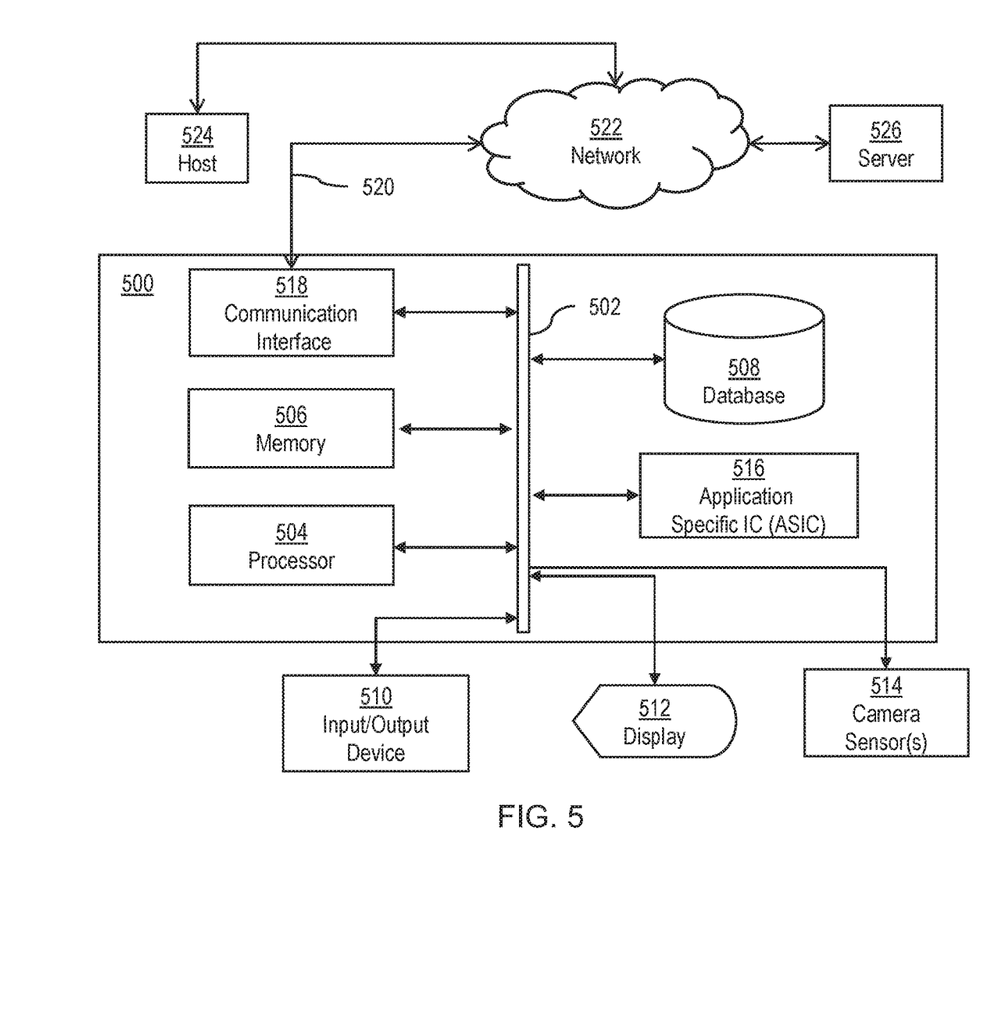
FIG. 5 is a computer system that is used to implement various exemplary embodiments of the disclosed subject matter

FIG. 5 illustrates a computer system 500 upon which an embodiment of the invention may be implemented. Although, the computer system 500 is depicted with respect to a particular device or equipment, it is contemplated that other devices or equipment (e.g., network elements, servers, etc.) within FIG. 5 can deploy the illustrated hardware and components of system. The computer system 500 is programmed (e.g., via computer program code or instructions) to inspect the objects by using one or more unmanned vehicles described herein and includes a communication mechanism such as a bus 502 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. The computer system 500, or a portion thereof, constitutes a means for performing one or more steps for inspecting the objects by using one or more unmanned vehicles.

A bus 502 includes one or more parallel conductors of information so that information is transferred quickly among devices coupled to the bus 502. One or more processors 504 for processing information are coupled with the bus 502.

The processor (or multiple processors) 504 performs a set of operations on information as specified by computer program code related to inspect the objects by using one or more unmanned vehicles. The computer program code is a set of instructions or statements providing instructions for the operation of the processor 504 and/or the computer system 500 to perform specified functions. The code, for example, may be written in a computer programming language that is compiled into a native instruction set of the processor 504. The code may also be written directly using the native instruction set (e.g., machine language). The set of operations include bringing information in from the bus 502 and placing information on the bus 502. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 504, such as a sequence of operation codes, constitute processor instructions, also called computer system instructions or, simply, computer instructions. The processors 504 may be implemented as mechanical, electrical, magnetic, optical, chemical, or quantum components, among others, alone or in combination.

The computer system 500 also includes a memory 505 coupled to the bus 502. The memory 506, such as a Random Access Memory (RAM) or any other dynamic storage device, stores information including processor instructions for storing information and instructions to be executed by the processor 504. The dynamic memory 506 allows information stored therein to be changed by the computer system 500. RAM allows a unit of information stored at a location called a memory address to be stored and retrieved independently of information at neighboring addresses. The memory 506 is also used by the processor 504 to store temporary values during execution of processor instructions. The computer system 500 also includes a Read Only Memory (ROM) or any other static storage device coupled to the bus 502 for storing static information, including instructions, that is not changed by the computer system 500. Some memory is composed of volatile storage that loses the information stored thereon when power is lost. Also coupled to the bus 502 is a non-volatile (persistent) storage device 508, such as a magnetic disk, a solid state disk, optical disk or flash card, for storing information, including instructions, that persists even when the computer system 500 is turned off or otherwise loses power.

Information, including instructions for inspecting the objects by using one or more unmanned vehicles is provided to the bus 502 for use by the processor 504 from an external input device 510, such as a keyboard containing alphanumeric keys operated by a human user, a microphone, an Infrared (IR) remote control, a joystick, a game pad, a stylus pen, a touch screen, or a sensor. The sensor detects conditions in its vicinity and transforms those detections into physical expression compatible with the measurable phenomenon used to represent information in the computer system 500. Other external devices coupled to the bus 502, used primarily for interacting with humans, include a display 512, such as a Cathode Ray Tube (CRT), a Liquid Crystal Display (LCD), a Light Emitting Diode (LED) display, an organic LED (OLED) display, active matrix display, Electrophoretic Display (EPD), a plasma screen, or a printer for presenting text or images, and a pointing device 516, such as a mouse, a trackball, cursor direction keys, or a motion sensor, for controlling a position of a small cursor image presented on the display 512 and issuing commands associated with graphical elements presented on the display 512, and one or more camera sensors 514 for capturing, recording and causing to store one or more still and/or moving images (e.g., videos, movies, etc.) which also may comprise audio recordings. Further, the display 512 may be a touch enabled display such as capacitive or resistive screen. In some embodiments, for example, in embodiments in which the computer system 500 performs all functions automatically without human input, one or more of the external input device 510, and the display device 512 may be omitted.

In the illustrated embodiment, special purpose hardware, such as an ASIC 516, is coupled to the bus 502. The special purpose hardware is configured to perform operations not performed by the processor 504 quickly enough for special purposes. Examples of ASICs include graphics accelerator cards for generating images for the display 512, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

The computer system 500 also includes one or more instances of a communication interface 518 coupled to the bus 502. The communication interface 518 provides a one-way or two-way communication coupling to a variety of external devices that operate with their own processors, such as printers, scanners and external disks. In general, the coupling is with a network link 520 that is connected to a local network 522 to which a variety of external devices with their own processors are connected. For example, the communication interface 518 may be a parallel port or a serial port or a Universal Serial Bus (USB) port on a personal computer. In some embodiments, the communication interface 518 is an Integrated Services Digital Network (ISDN) card, a Digital Subscriber Line (DSL) card, or a telephone modem that provides an information communication connection to a corresponding type of a telephone line. In some embodiments, the communication interface 518 is a cable modem that converts signals on the bus 502 into signals for a communication connection over a coaxial cable or into optical signals for a communication connection over a fiber optic cable. As another example, the communications interface 518 may be a Local Area Network (LAN) card to provide a data communication connection to a compatible LAN, such as Ethernet or an Asynchronous Transfer Mode (ATM) network. In one embodiment, wireless links may also be implemented. For wireless links, the communication interface 518 sends or receives or both sends and receives electrical, acoustic or electromagnetic signals, including infrared and optical signals that carry information streams, such as digital data. For example, in wireless handheld devices, such as mobile telephones like cell phones, the communication interface 518 includes a radio band electromagnetic transmitter and receiver called a radio transceiver.

In certain embodiments, the communication interface 518 enables connection to the communication network 108 for inspecting the objects by using one or more unmanned vehicles. Further, the communication interface 518 can include peripheral interface devices, such as a thunderbolt interface, a Personal Computer Memory Card International Association (PCMCIA) interface, etc. Although a single communication interface 518 is depicted, multiple communication interfaces can also be employed.

The term "computer-readable medium" as used herein refers to any medium that participates in providing information to the processor 504, including instructions for execution. Such a medium may take many forms, including, but not limited to, computer-readable storage medium (e.g., non-volatile media, volatile media), and transmission media. Non-transitory media, such as non-volatile media, include, for example, optical or magnetic disks, such as the storage device 508. Volatile media include, for example, the dynamic memory 506. Transmission media include, for example, twisted pair cables, coaxial cables, copper wire, fiber optic cables, and carrier waves that travel through space without wires or cables, such as acoustic waves, optical or electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a USB flash drive, a Blu-ray disk, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 516.

The network link 520 typically provides information communication using transmission media through one or more networks to other devices that use or process the information. For example, the network link 520 may provide a connection through the local network 522 to a host computer 524 or to ISP equipment operated by an Internet Service Provider (ISP).

A computer called a server host 526, connected to the Internet, hosts a process that provides a service in response to information received over the Internet. For example, the server host 526 hosts a process that provides information representing video data for presentation at the display 512. It is contemplated that the components of the computer system 500 can be deployed in various configurations within other computer systems, e.g., the host 524 and the server 526.

At least some embodiments of the invention are related to the use of the computer system 500 for implementing some or all of the techniques described herein. According to one embodiment of the invention, those techniques are performed by the computer system 500 in response to the processor 504 executing one or more sequences of one or more processor instructions contained in the memory 506. Such instructions, also called computer instructions, software and program code, may be read into the memory 506 from another computer-readable medium such as the storage device 508 or the network link 520. Execution of the sequences of instructions contained in the memory 506 causes the processor 504 to perform one or more of the method steps described herein. In alternative embodiments, hardware, such as the ASIC 516, may be used in place of or in combination with software to implement the invention. Thus, embodiments of the invention are not limited to any specific combination of hardware and software, unless otherwise explicitly stated herein.

Various forms of computer readable media may be involved in carrying one or more sequence of instructions or data or both to the processor 504 for execution. For example, instructions and data may initially be carried on a magnetic disk of a remote computer such as the host 524. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 520. An infrared detector serving as the communication interface 518 receives the instructions and data carried in the infrared signal and places information representing the instructions and data onto the bus 502. The bus 502 carries the information to the memory 506 from which the processor 504 retrieves and executes the instructions using some of the data sent with the instructions. The instructions and data received in the memory 506 may optionally be stored on the storage device 508, either before or after execution by the processor 504.

III. Alternative Embodiments

The unmanned vehicles 102 can also operate as a type of satellite (relaying data to and from communications equipment) to assess data rate transmission and thereby assess performance, damage, etc., of the communications equipment. Unmanned vehicle swarms can use electronic assessments to selectively transmit/receive signals from different members of the swarm to perform precise directional analysis of signals, and then swap transmission and receiving functions without spatially changing to test a reverse direction. Unmanned vehicles and vehicle swarms can use electronic assessments to detect nonlinear signals, such as are produced in response to electronically interacting with a nonlinear device (cell phone, laptop, router, walkie-talkie, etc.). These devices are often used in the detonation of improvised explosive devices (IED's), or could also be expected to be on a missing person, vehicle, etc.

Unmanned vehicles and vehicle swarms can use electronic assessments to detect changes in the atmosphere to perform atmospheric analysis (i.e., ozone levels, pollution, glacial melting, organic growth (forest depletion), etc.).

While certain embodiments of the invention are described above, and FIGS. 1-5 disclose the best mode for practicing the various inventive aspects, it should be understood that the invention can be embodied and configured in many different ways without departing from the spirit and scope of the invention.

For example, embodiments are disclosed above in the context of an unmanned vehicle. However, embodiments are intended to include or otherwise cover any type of unmanned vehicle, including, an unmanned aerial vehicle, an unmanned terrestrial vehicle, a drone, a gyrocopter, etc. In fact, embodiments are intended to include or otherwise cover configurations of the unmanned vehicle.

Embodiments are disclosed above in the context of inspecting cellular phone towers. However, embodiments are intended to cover any object such as, but is not restricted to, water towers, pylons, bridges, airports including both tarmac/runway and control tower inspections), power lines, fuel bunkers, power plants, incarceration facilities, damns, water plants, Amplitude Modulation (AM)/Frequency Modulation (FM) towers, and so forth.

Exemplary embodiments are intended to include or otherwise cover any type of structural parameters of the objects disclosed above.

Exemplary embodiments are also intended to cover any additional or alternative components of the unmanned vehicle disclosed above. Exemplary embodiments are further intended to cover omission of any component of the unmanned vehicle disclosed above.

Embodiments are disclosed above in the context of inspecting commuter rail lines. However, embodiments are intended to cover any unmanned non-rail guided terrestrial vehicles, single rail guided unmanned vehicles, and so forth.

Embodiments are also intended to include or otherwise cover the inspection of objects for parcel delivery by using the stereoscopic images. The reason can be beneficial because 3D depth perception increases with the separation of the collaborating unmanned vehicle. By employing two or more unmanned vehicles, a fleet of unmanned vehicles can increase the precision of a target location for parcel delivery.

Embodiments are also intended to include or otherwise use stereoscopic images for accurately estimating payload delivery targets, for example, parcels, weapons, and the like.

Embodiments are also intended to include or otherwise use stereoscopic images for accurately locating assets, for example, missing persons, errant vehicles, and the like.

Embodiments are also intended to include or otherwise use stereoscopic images for ascertaining structural assets or defects (such as breaches, leaks, etc.) used to survey entities such as cell towers, wind turbines, water towers, pylons, bridges, airports (both tarmac/runway and control tower inspections), power lines, fuel bunkers, power plants, incarceration facilities, damns, water plants, AM/FM towers, etc.

Exemplary embodiments are also intended to include and/or otherwise use unmanned vehicle swarms for selectively transmit and/or receive optical signals in order to achieve extremely precise holographic images.

Exemplary embodiments are also intended to include and/or otherwise a v-formation of the unmanned vehicle swarm or a fleet of unmanned vehicles, which can cause each of the unmanned vehicles to be well separated. The separation of the unmanned vehicles can allow each of the unmanned vehicles to individually receive and mutually combine images of the objects. However, embodiments of the disclosed subject matter are intended to include or otherwise cover any type of formation that may be beneficial.

Embodiments are also intended to include or otherwise cover methods of manufacturing the unmanned vehicle disclosed above. The methods of manufacturing include or otherwise cover processors and computer programs implemented by processors used to design various elements of the unmanned vehicle disclosed above.

Exemplary embodiments are intended to cover all software or computer programs capable of enabling processors to implement the above operations, designs and determinations. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations of airbag housing assemblies disclosed above.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or subnetworks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of a network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

While the subject matter has been described in detail with reference to exemplary embodiments thereof, it will be apparent to one skilled in the art that various changes can be made, and equivalents employed, without departing from the scope of the invention.

What is claimed is:

1. An unmanned vehicle for assessing an object capable of emitting electromagnetic data signals, the unmanned vehicle comprising:
   a control unit that is configured to move the unmanned vehicle to a plurality of positions relative to the object;
   a transceiver that is configured to transmit and receive signals at each of the plurality of positions;
   a data collection unit that is configured to capture at least one image at each of the plurality of positions; and
   an assessment unit that is configured to assess:

at least one electronic signal transceiver performance parameter associated with the object based on the communication between the transceiver and the object; and one or more structural parameters associated with the object based on the captured images.

2. The unmanned vehicle of claim 1, wherein the assessment unit determines the at least one performance parameter associated with the object based on an intensity of the received signals and a corresponding position of the unmanned vehicle.

3. The unmanned vehicle of claim 1, wherein the assessment unit is further configured to estimate atmospheric changes based on the at least one performance parameter associated with the object.

4. The unmanned vehicle of claim 1, wherein the unmanned vehicle further includes a communication unit that is in communication with at least one companion unmanned vehicle, the communication unit configured to determine a position of the at least one companion unmanned vehicle relative to the unmanned vehicle.

5. The unmanned vehicle of claim 4, wherein the control unit is further configured to move the unmanned vehicle based on the position of the at least one companion unmanned vehicle such that the unmanned vehicle and the at least one companion unmanned vehicle are orthogonally positioned relative to the object.

6. The unmanned vehicle of claim 1, wherein the data collection unit is further configured to record a phase, a frequency and amplitude of light emanating from the object to capture a plurality of images.

7. The unmanned vehicle of claim 1, wherein the data collection unit is further configured to generate a composite image from the plurality of images.

8. The unmanned vehicle of claim 1, wherein the assessment unit is further configured to compare the composite image with a pre-stored image of the object to determine the at least one structural parameter.

9. A system for assessing an object capable of emitting electromagnetic data signals, the system comprising:
a plurality of unmanned vehicles, each of the plurality of unmanned vehicles comprising:
a control unit that is configured to move the unmanned vehicle to at least one position relative to the object;
a transceiver that is configured to transmit and receive signals from the object;
a data collection unit that is configured to capture at least one image of the object; and
an assessment unit generating a local report based on the signals received by the transceiver unit;
a central platform that is in communication with each of the plurality of unmanned vehicles, the central platform configured to:
receive the at least one image of the object and the local report from each of the plurality of unmanned vehicles;
determine at least one electronic signal transceiver performance parameter associated with the object based on the received local reports; and
determine one or more structural parameters associated with the object based on the received images.

10. The system of claim 9, wherein the assessment unit of each of the plurality of unmanned vehicles is further configured to:
determine an intensity of the received signals from the object; and
generate the local report based on the intensity of the received signals and the at least one position of the unmanned vehicle relative to the object.

11. The system of claim 9, wherein the central platform is further configured to:
generate a composite image based on the received images;
compare the composite image with a pre-stored image of the object; and
determine the one or more structural parameters based on the comparison.

12. The system of claim 9, wherein each of the plurality of unmanned vehicles includes a laser unit that is configured to selectively project laser towards the object.

13. The system of claim 12, wherein the assessment unit is further configured to generate a three dimensional holographic image of the object based on interference patterns received by the transceiver unit.

14. The system of claim 9, wherein the central platform is at least one of a fixed base station or a movable base station.

15. A method of assessing an object capable of emitting electromagnetic data signals by an unmanned vehicle, the method comprising:
moving the unmanned vehicle to a plurality of positions relative to the object;
transmitting signals from each of the plurality of positions and receiving signals at each of the plurality of positions;
capturing at least one image at each of the plurality of positions; and
determining at least one electronic signal transceiver performance parameter associated with the object based on the communication between the transceiver and the object;
determining one or more structural parameters associated with the object based on the captured images.

16. The method of claim 15, further comprising determining at least one performance parameter associated with the object based on an intensity of the received signal and a corresponding position of unmanned vehicle.

17. The method of claim 15, further comprising determining the position of the unmanned vehicle relative to at least one companion unmanned vehicle and the object.

18. The method of claim 17, further comprising positioning the unmanned vehicle relative to the at least one unmanned vehicle and the object such that the unmanned vehicle and the at least one companion unmanned vehicle are orthogonally positioned relative to the object.

19. The method of claim 15, further comprising generating a composite image based on the plurality of images.

20. The method of claim 19, further comprising determining one or more structural parameters associated with the object by comparing the composite image with a pre-stored image of the object.

* * * * *